May 2, 1944.  D. G. HUNTER  2,347,951
PHOTOGRAPHIC FOCAL PLANE SHUTTER
Filed June 6, 1942  4 Sheets-Sheet 1
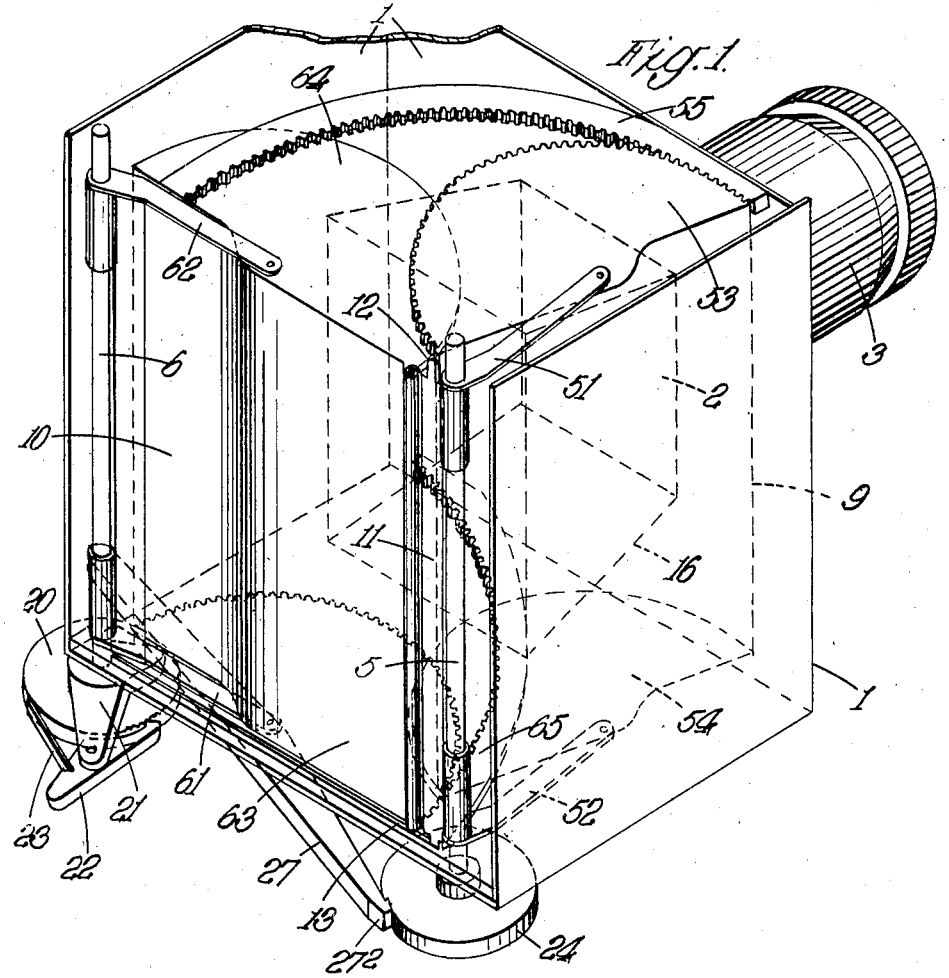
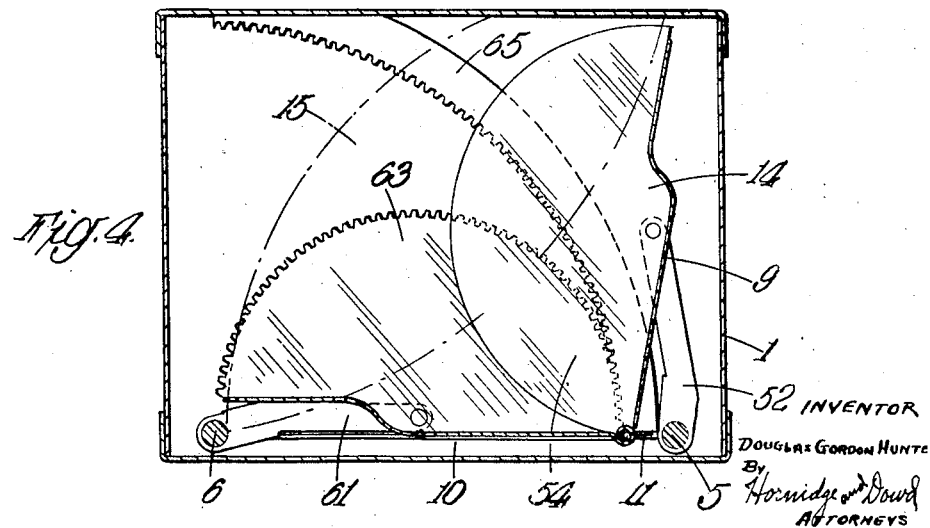

May 2, 1944.  D. G. HUNTER  2,347,951
PHOTOGRAPHIC FOCAL PLANE SHUTTER
Filed June 6, 1942  4 Sheets-Sheet 2
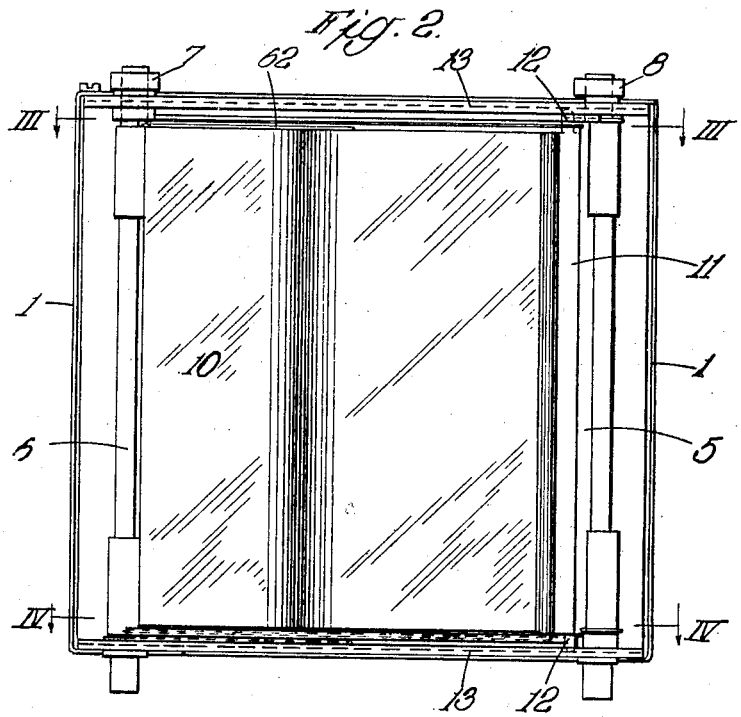
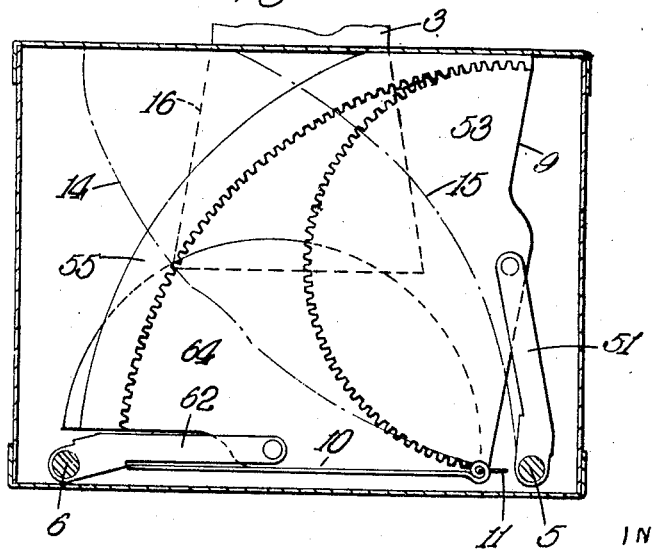
INVENTOR
DOUGLAS GORDON HUNTER
BY Horridge and Dowd
ATTORNEYS May 2, 1944. D. G. HUNTER 2,347,951
PHOTOGRAPHIC FOCAL PLANE SHUTTER
Filed June 6, 1942 4 Sheets-Sheet 3
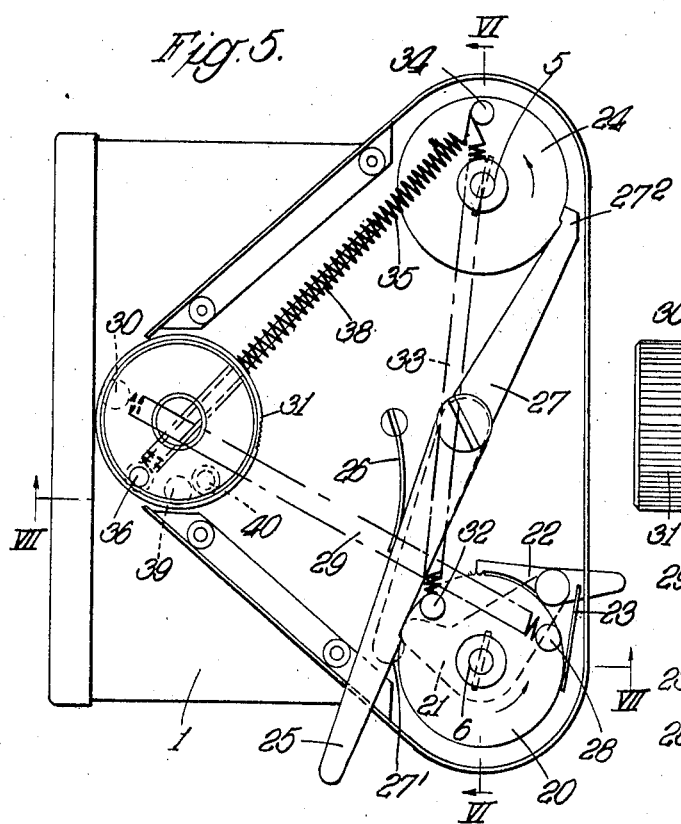
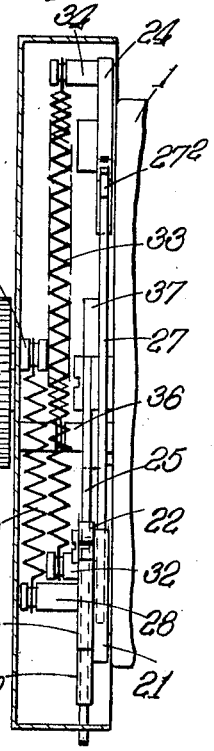
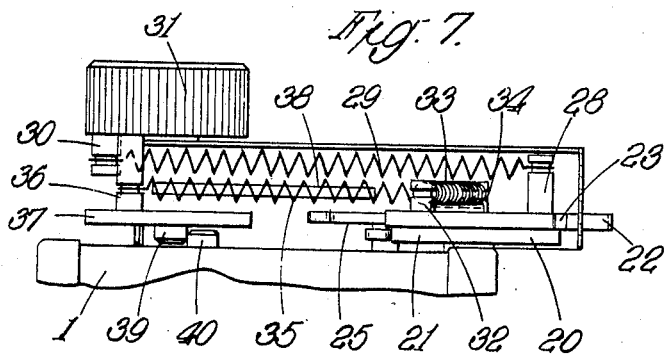
INVENTOR
DOUGLAS GORDON HUNTER
BY Horridge and Dowd
ATTORNEYS May 2, 1944.                    D. G. HUNTER                    2,347,951
                        PHOTOGRAPHIC FOCAL PLANE SHUTTER
                           Filed June 6, 1942        4 Sheets-Sheet 4
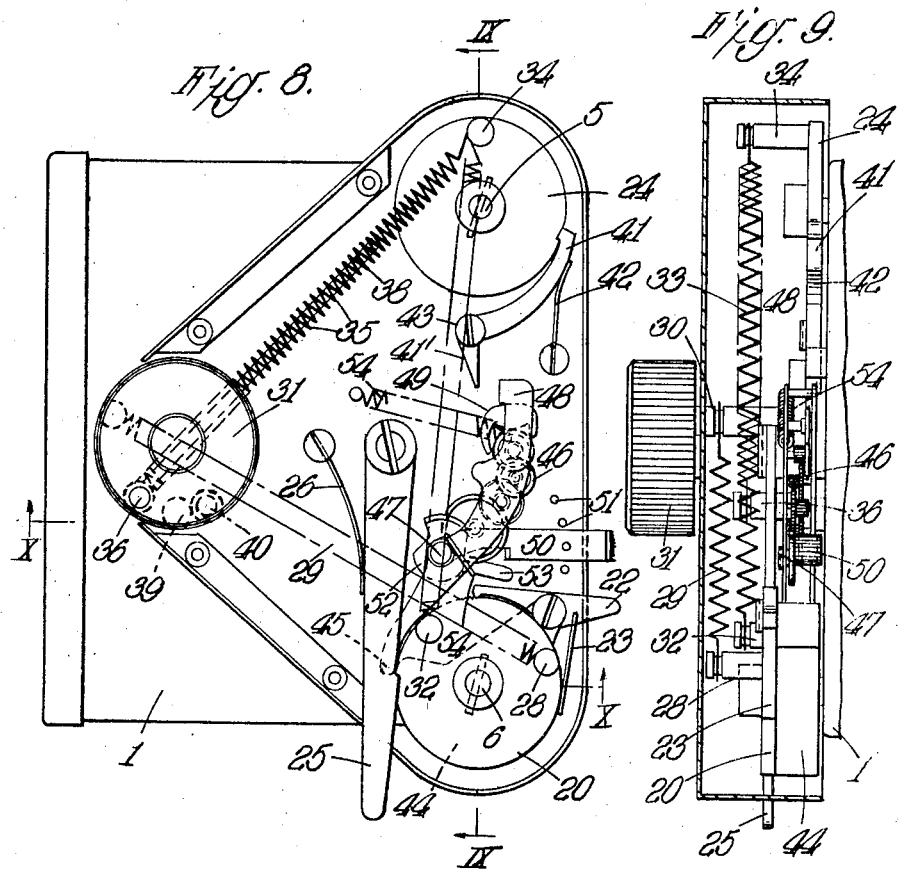
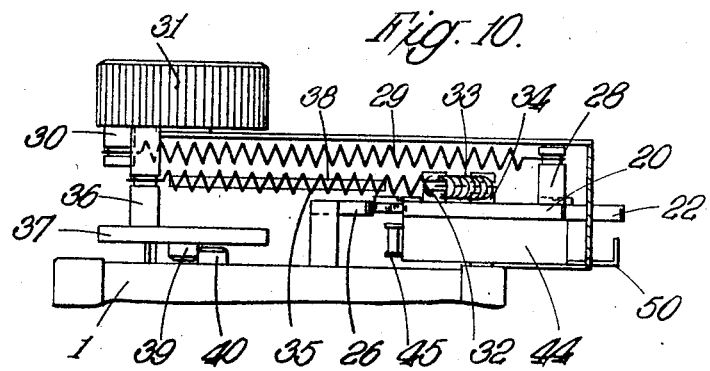
INVENTOR
DOUGLAS GORDON HUNTER
BY Horridge and Dowd
ATTORNEYS Patented May 2, 1944

2,347,951

UNITED STATES PATENT OFFICE 2,347,951

PHOTOGRAPHIC FOCAL PLANE SHUTTER

Douglas Gordon Hunter, London, England, assignor to The Houghton-Butcher Manufacturinng Company, Limited, London, England, a British company Application June 6, 1942, Serial No. 446,108
In Great Britain June 13, 1941

6 Claims. (Cl. 95—58)

This invention relates to improvements in focal plane shutters for cameras by means of which an emulsion is exposed to light through a slit which moves over a path parallel to the emulsion surface and at a short distance therefrom. In this type of shutter it is essential that all light be excluded from the emulsion other than that which passes through the slit. This necessity involves the use of blinds, bellows or other moving light-obscuring devices which, by repeated use, may become inefficient apart from other disadvantages.

An object of the present invention is to provide an improved shutter of the kind specified which avoids the disadvantages briefly mentioned above.

A further object is to provide a shutter such that higher speeds of operation may be obtained than hitherto possible.

According to the invention, the shutter comprises a pair of rigid plates which are substantially centrally pivoted to carriers which are in turn mounted on fixed pivots and the plates are so guided during the movement of the carriers that the one edge of the one plate follows the adjacent edge of the other plate along a path substantially parallel to the emulsion surface, during which movement light may reach the emulsion through the gap between the two plates whilst it is otherwise prevented from reaching the same by the body of the plates.

According to a further feature of the invention, each plate is associated with a toothed sector which meshes with a fixed toothed quadrant such that, during movement of the carriers, the plates are rotated about their pivots and the edge of the one plate is caused to move along a straight line path along which also moves the adjacent edge of the other plate.

In a modified construction according to the present invention, the adjacent edges of the plates are caused to move in the manner desired by engaging with fixed guides which thereby cause rotation of the plates about their pivots during pivoting of the carriers.

In both of the above cases, the two plates are initially substantially at right angles to one another and, during the movements thereof about their pivots, the plates maintain substantially the same angular relation and form a light-obstructing wall which extends across a casing in which they are mounted, except at the slit between the adjacent edges of the plates.

If desired an additional light-obscuring means may be provided to prevent any light creeping around the edges of the two plates, thus in one case the toothed sector may serve also a a light shield at one end of a plate when a similar but untoothed sector may be provided for the same purpose at the other end of the plate whilst in the other case sector shaped flanges may be provided at both ends of each plate. In addition a light shield may be provided in the casing containing the shutter plates and disposed around the aperture leading to the camera lens.

The two pairs of carriers for the shutter plates are preferably independently spring-loaded to cause appropriate movement thereof under control of a suitable release mechanism which permits movement first of the one plate and thereafter of the second plate so that a gap occurs between adjacent edges of the plates during movement to provide the slit for effecting exposure. The time lag between the successive releases may be varied in order to vary the width of the slit and hence the duration of exposure.

During reverse movement or initial setting, the adjacent edges of the shutter plates may abut to provide a light-tight closure but it is preferred to provide means for masking the gap to prevent passage of light between the plates during this operation.

The shutter mechanism not only gives all the advantages of a normal focal plane shutter but enables greater speeds to be obtained than hitherto possible.

In order that the invention may be clearly understood and readily carried into effect, a construction thereof is hereinafter more fully described with reference to the accompanying drawings which are given for purposes of illustration only and not of limitation.

In these drawings:

Fig. 1 is a perspective view with part of the casing omitted;

Fig. 2 is an elevation looking in the direction of the lens;

Fig. 3 is a section taken on the line III—III of Fig. 2;

Fig. 4 is a section taken on the line IV—IV of Fig. 2;

Fig. 5 is an under-plan view showing the operating mechanism;

Fig. 6 is a section on the line VI—VI of Fig. 5 to show an elevation of the operating mechanism as seen from the right-hand side of Fig. 5;

Fig. 7 is a view similar to Fig. 6 on the line VII—VII of Fig. 5 to show the operating mechanism as seen from the bottom of Fig. 5; and Figs. 8 to 10 are views similar to Figs. 5 and 7, respectively showing a modified form of operating mechanism, the sections being taken on the lines IX—IX and X—X corresponding to the lines VI—VI and VII—VII, respectively.

Referring to the said drawings, throughout which the parts are shown in set position ready to operate, and referring particularly to Figs. 1 to 3 thereof, the shutter mechanism hereinafter described is arranged within a rigid light-tight casing 1 of rectangular form, which opens at the one end through an aperture 2 onto the camera lens mounted in a housing 3, and which opens at the opposite end onto the sensitized emulsion surface of a photographic film or plate.

In each corner of the casing 1 adjacent where it opens onto the emulsion surface, there is provided one of a pair of parallel shafts 5, 6 suitably mounted for free rotation. These shafts 5, 6 extend through the top and bottom walls of the casing 1 and at their upper ends are provided with collars 7, 8 (Fig. 2) or the equivalent to prevent axial displacement whilst their lower ends are operated on by the release mechanism hereinafter described with reference to Figs. 5 to 7 and 8 to 10 of the accompanying drawings.

Within the casing 1 and near each end of each of the shafts 5 and 6 there is secured a carrier in the form of a radial arm 51, 52, 61, 62 to the free ends of which are pivoted, respectively, sectors or semi-circular plates 53, 54, 63, 64. The sector 53 is externally toothed along its curved edge and the teeth thereof mesh with the teeth of an interally toothed quadrant 55 mounted fast within the casing. The sector 63 is similarly externally toothed to mesh with an internally toothed quadrant 65 in the same relationship but oppositely arranged at the opposite side of the casing to the sector 53 and quadrant 55.

The pitch circles of the teeth on the sectors 53, 63 are struck from the centres of the pivotal connections with the radial arms 51, 61 respectively and the radius of each circle is equal to the radii of the pivots from the fulcrums or rotational axes of the shafts 5, 6 which lie along the radial arms 51, 61. The pitch radius of the teeth of the quadrants 55, 65 is twice that of the sectors 53, 63 and the centres thereof are coincident with the fulcrums or rotational axes of the shafts 5, 6, respectively. Due to the relative sizes of the meshing gears, any point on the pitch circle of the sectors will move in a straight line.

Between the bases of the sectors 53, 54 and 63, 64 respectively extend shutter plates 9, 10 each of which is large enough to cover completely the aperture through which the sensitized surface is exposed. The one edge of each shutter plate 9, 10 lies on the pitch circle of its sector and thus on rotation of the shaft 6, the radius arms 51, 61 are swung round and the sector 63 rolls on the quadrant 65 thereby moving the plate 10 so that its one edge moves along a straight path parallel to the emulsion surface.

On rotating the shaft 5, a similar movement takes place but, as the parts are oppositely arranged, the opposite edge of the plate 9 follows the path traversed by the adjacent edge of the plate 10 along the same straight line path. Initially, the two plates 9, 10 are substantially at right angles to one another and, during the movement thereof which preferably takes place synchronously, they substantially maintain that relationship.

The sectors 54, 64 in this case merely serve as light shields but equally well they could be toothed and arranged to mesh with toothed sectors similar to the quadrants 55, 65. By commencing to rotate the shaft 6 before the shaft 5, the edge of the plate 10 will move away from the edge of the plate 9 and there will thus be a narrow slit between the plates during such movement thereof through which light may pass from the camera lens to expose the sensitized emulsion surface. The width of the slit and hence the duration of exposure may be varied by altering the time of commencement of rotation of the shaft 6 in relation to the time of commencement of rotation of the shaft 5.

During movement of the plates 9, 10 as for setting the operating mechanism as later described, the adjacent edges of the plates may abut in a light-tight manner but preferably there will be hingedly connected to the edge of the plate 10 a narrow plate 11. This plate 11 has extensions 12 at both ends which work in guide channels 13 so that the plate 11 lies in the plane of, and is constrained to move along, the straight path traversed by the adjacent edges of the plates 9, 10. During movement of the plates 9, 10 to effect exposure the slit is between the edge of the plate 11 and the edge of the plate 9 but during reverse movement the plate 11 overlaps the end of the plate 9 and so obscures any gap that might occur between the plates 9, 10. Naturally the hinging of the plate 11 to the plate 10 must be effected in a light-tight manner, for example as shown by so bending around the edges of the two plates 10, 11 that relatively hinging movement may occur without separation.

The plates 9, 10 need not be flat and preferably they are given the shape illustrated (see Figs. 3 and 4) in order that their slit defining edges may be brought as close as possible to the emulsion surface without fouling the shafts 5, 6. The bend in the plates also gives them greater rigidity and if desired they may also be thicker at their centres to provide extra strength as well as rigidity.

In order to ensure that light will not creep past the sectors 53, 54, 63, 64, shield plates whose curved edges are indicated by chain lines 14, 15 (Figs. 3 and 4) may be provided one at the top and the other at the bottom of the casing to close the space not bridged by the pairs of sectors 53, 64 and 54, 63 respectively. Still further to limit possible creepage of light a shield 16, indicated by broken lines (Figs. 1 and 3), may be provided around the aperture 4 leading to the lens housing 3 to limit the direction in which light may travel.

A form of operating mechanism will now be described with particular reference to Figs. 5 to 7 of the accompanying drawings. Fast on the end of the shaft 6 is a disc 20 whilst free thereon is an element 21 which is adjustably connected to the disc 20 by means of a pawl 22 carried by the former which is urged by a leaf spring 23 to engage teeth provided in the periphery of the latter. Fast on the shaft 5 is a disc 24. A simple lever 25 has a projection which engages a cooperating notch in the disc 20 (in set position as illustrated) under the influence of a leaf spring 26. This lever 25 is the operating lever and projects out through the casing for convenient manual operation. A double arm 27 which conveniently pivots about the same axis as the lever 25, has a nose 27¹ at one end which lies in the path traversed by a portion of the element 21 and at its other end a nose 27² adapted to engage a notch in the disc 24 when the latter is in operative position as shown.

A stud 28 on the disc 20 has attached to it one end of a spring 29 the other end of which is attached to a stud 30 carried by an externally operable rotatable drum 31. A further stud 32 on the disc 20 has attached to it one end of a spring 33 the other end of which is attached to a stud 34 on the disc 24 whilst a third spring 35 extends between the stud 34 and a further stud 36 extending between the drum 31 and a disc 37 mounted for rotation about an axis coincident with the axis of the drum 31. Of these three springs, the spring 33 is weaker than the other two which may be substantially (and desirably are) of the same strength. Within the spring 35 is a rod 38 which extends part of the way therealong and is anchored to the stud 36. Also on the disc 37 is a stud 39 which will engage with a stud 40 mounted on the casing 1 to act as a limit stop.

The discs 20, 24 are capable of rotation through 90° and thereby move the shutter plates from one limit position to the other, whilst the drum 31 is capable of rotation through 180°.

To set the mechanism, the drum 31 is manually rotated in clockwise direction (Fig. 5) so that the studs 30, 36 move nearer the studs 28, 34 and the springs 29, 35 respectively therebetween are relieved of tension. The rotation of the drum 31 causes the free end of the rod 38 to engage the stud 34 and thereby brings about clockwise rotation of the disc 24 toward the position shown. Rotation of the disc 24 increases the tension of the spring 33 so causing it to pull around the disc 20 in a clockwise direction toward the position shown. The two discs 20, 24 thus move substantially simultaneously and therefore the plates 9, 10 move together during this setting operation throughout which any possible gap between the adjacent edges of the plates 9, 10 is masked by the plate 11 as previously described.

After 90° of rotation of the discs 20, 24, the notch on the former disc is engaged by the notch in the lever 25 whilst the notch in the latter disc is engaged by the nose 27² of the lever 27 (Fig. 5). Reverse movement of these discs 20, 24 is thus prevented. The drum 31 is next rotated in reverse direction until the stud 39 abuts the limit stop stud 40. The original tension is thus restored to the springs 29, 35 and both the discs 20, 24 are thereby substantially equally loaded by forces tending to rotate them to their original positions whilst the drum 31 and disc 37 are held by the tension of the springs 29, 38 with the studs 39, 40 in contact, as the centre lines of the springs 29, 38 have moved over and just past the centre of the drum 31.

The element 21 is adjusted in angular relation to the disc 20 by disengaging and re-engaging the pawl 22. The mechanism is now ready to operate to effect an exposure.

On rocking the operating lever 25, it disengages the disc 20 while flies round under the urge of the spring 29 during which rotation the shaft 6 is rotated to swing the radius arms 61, 62 and move the shutter plate 10 from its position covering the emulsion surface to its other possible position against the side of the casing 1 as previously described.

The pawl 22 by engaging the teeth in the periphery of the disc 20 causes the element 21 to rotate with that disc. After a period of time which is determined by the relative angular position thereof, the element 21 engages the nose 27¹ thereby rocking the lever 27 and disengaging its nose 27² from the notch in the disc 24. This disc 24 now flies round under the influence of the spring 35 so rotating the shaft 5 and moving the shutter plate 9 from its position against the side of the casing to its other possible position to cover the emulsion surface.

As the shaft 6 and hence the plate 10 commences to move before the shaft 5 and the plate 9, the edge of the plate 10 adjacent the plate 9 initially moves away therefrom together with the attached plate 11. A gap or slit is thus left between the two plates which is maintained during the movement thereof as they move at substantially the same speed as they are acted on by substantially equal forces. The width of this gap is determined, as mentioned before, by the time which elapses between the commencement of rotation of the shafts 5, 6 which is governed by the setting of the element 21.

In the foregoing arrangement the one shaft commences to rotate fairly quickly after the other throughout the range of adjustment of the element 21, and sometimes it may be desirable for the lapse of time to be lengthened in order to give longer exposures. A modified operating mechanism for this purpose will now be described with reference to Figs. 8 to 10 of the accompanying drawings. In these figures many parts are similar to parts already described with reference to Figs. 5 to 7 and as these parts bear the same reference numerals they need no further description.

Instead of the double arm lever 27, the notch in the disc 24 is engaged by the nose of a pawl 41 which is urged into operative position by a leaf spring 42. The pawl 41 pivots about a pin 43 beyond which extends a tail portion 41¹. The element 21 is replaced by a cam 44 which is free to rotate on the shaft 6 and carries the pawl 22 as previously described. The cam 44 has a cut-away portion into which may extend an extension 45 of an escapement assembly consisting of a train of gear wheels 46 and mounted for bodily pivotal movement about a pin 47.

The opposite end 48 of the escapement assembly, whereat is situated the pallet 49, is adapted on rocking movement of the escapement assembly to engage the tail 41¹ to trip the pawl 41 to release the disc 24. Also pivoting on the pin 47 is a manually operable lever 50 adjustable into one of several possible positions by engaging with locating holes 51. The first element 52 of the gear train 46 has an extension 53 and is tensioned by a leaf spring 54. This arrangement is such that the extension 53 may engage the lever 50 in all but one of its possible positions. A spring 54¹ tends to rock the escapement assembly bodily about its pivot 47.

In the drawings the parts are shown in their set positions into which they have been brought by the procedure already described with reference to Figs. 5 to 7.

Assume that the lever 50 is in its position in which it will not be engaged by the extension 53 so that the latter and hence the escapement assembly as a whole may move unimpeded. On rocking the operating lever 25 it disengages from the disc 20 which flies round and moves the shutter plate 10. After a lapse of time determined by the position of the pawl 22, the cam 44 which moves with the disc 20 reaches a position in which the extension 45 may enter the cut-away portion thereof to permit rocking movement of the escapement assembly under the urge of the spring 54¹. This rocking movement causes the end 48 of the escapement assembly to engage the tail 41¹ to trip the pawl 41 to release the disc 24 which flies round and moves the shutter plate 9 exactly as previously described. Thus in this condition the mechanism operates similarly to the mechanism described with reference to Figs. 5 to 7 and is so used for more rapid exposures.

For slower exposures the lever 50 is moved into one of its other positions in which it obstructs the movement of the extension 53 on rocking of the escapement assembly. After initial movements of the parts following operation of the lever 25, the extension 45 enters the cut-away portion of the cam 44 and the escapement assembly commences to rock until the extension 53 engages the lever 50. Thus any further movement of the escapement assembly about its pivot 47 will cause the end element 52 to drive the chain of gears 46 and eventually the pallet 49 thus slowing down the movement of the escapement assembly to give a longer period before its end 48 trips the pawl 41. Different periods of time are determined by the possible positions of the lever 50 as well as by the angular position of the cam 44 relative to the disc 20.

Whilst two preferred operating mechanisms have been described, the invention is not limited to the use of either of such mechanisms since other equivalently acting mechanisms may equally well be employed. Similarly the invention is not limited to the precise relation of the sectors 53, 63 to their cooperating quadrants 55, 65 since small differences whilst not giving a straight line motion to the adjacent edges of the shutter plates 9, 10 will give a motion which is near enough rectilinear for practical purposes. Furthermore the positioning of the operating mechanism below the casing 1 is purely relative since it may be at the top or at one side depending on the position of the casing 1.

What I claim is:

1. A focal plane shutter for a camera including a casing, a pair of rigid plates each large enough by itself to cover an aperture in said casing through which an emulsion surface may be exposed, a pair of shafts adjacent said aperture, a pair of radial arms on each of said shafts, the free ends of each pair of radial arms being pivotally connected to one and the other of said plates respectively, means for rotating said shafts to cause said radial arms to displace said plates, a toothed sector associated with each of said plates, a pair of oppositely arranged toothed quadrants with which said toothed sectors mesh so that during movement of the plates the sectors roll in the quadrants and cause the adjacent edges of said plates to traverse a rectilinear path, and means for causing said adjacent edges of said plates to be separated during movement thereof by a gap through which light may pass to expose an emulsion surface.

2. A focal plane shutter for a camera including a casing, a pair of rigid plates each large enough by itself to cover an aperture in said casing through which an emulsion surface may be exposed, a pair of shafts adjacent said aperture, a pair of radial arms on each of said shafts, the free ends of each pair of radial arms being pivotally connected to one and the other of said plates respectively, means for rotating said shafts to cause said radial arms to displace said plates, a toothed sector associated with each of said plates, a pair of oppositely arranged toothed quadrants with which mesh said toothed sectors such that during movement of the plates the sectors roll in the quadrants and the adjacent edges of said plates traverse a rectilinear path, means for causing said adjacent edges of said plates to be separated during movement thereof by a gap through which light may pass to expose an emulsion surface, a third plate hinged in a light-tight manner to the edge of one of said plates to mask the adjacent edges of the plates during movement thereof in the resetting direction, and means for constraining said third plate to lie in the plane of the rectilinear path traversed by the adjacent edges of said plates.

3. A focal plane shutter for a camera including a casing, a pair of rigid plates each large enough by itself to cover an aperture in said casing through which an emulsion surface may be exposed, a pair of shafts adjacent said aperture, a pair of radial arms on each of said shafts, the free ends of each pair of radial arms being pivotally connected to one and the other of said plates respectively, means for rotating said shafts to cause said radial arms to displace said plates, a toothed sector associated with each of said plates, a pair of oppositely arranged toothed quadrants with which mesh said toothed sectors such that during movement of the plates the sectors roll in the quadrants and the adjacent edges of said plates traverse a rectilinear path, independent spring means for rotating each of said shafts, means for latching said shafts against rotation by said spring means, means for releasing first one and then the other of said latching means whereby one plate commences to move before the other so that there is a gap between the adjacent edges of said plates through which light may pass during movement thereof to effect an exposure, and adjustable means operable to alter the period of time between the successive releasing of said latching means to vary the width of the gap and hence the duration of exposure.

4. A focal plane shutter including a casing having an aperture therein through which an emulsion surface may be exposed and an opposed aperture leading to the camera objective, a pair of rigid plates located at an angle to one another and each large enough to cover the aperture in said casing through which the emulsion surface may be exposed, a pair of sector shaped plates at opposite edges of each of said rigid plates of which pairs of sector shaped plates at least one is toothed, a pair of shafts adjacent said aperture in said casing and each carrying a pair of radial arms which are pivotally connected at their ends to the centres of said sector shaped plates, toothed quadrants of a pitch radius which is twice that of the toothed sectors for meshing with the respective toothed sectors, means for rotating said shafts to cause said pairs of radial arms to displace said rigid plates during which time the adjacent edges of the rigid plates traverse a rectilinear path across the aperture in said casing, and adjustable means for causing one of said shafts to commence to rotate before the other so that a gap occurs between the adjacent edges of the plates through which light may pass to expose an emulsion surface.

5. A focal plane shutter including a light-tight casing having an aperture therein through which an emulsion surface may be exposed and an opposed aperture leading to the camera objective, a pair of rigid metal plates normally located at an angle to one another and each large enough by itself to cover the aperture in said casing through which the emulsion surface may be exposed, a pair of sector shaped plates extending at right angles from opposite edges of each of said rigid plates of which pairs of sector shaped plates at least one is toothed, a third plate hinged in a light-tight manner to the edge of one of said rigid plates to mask the adjacent edges of the plates during movement thereof in the resetting direction, means for constraining said third plate to lie always in one plane, a pair of shafts adjacent said aperture in said casing and each carrying a pair of radial arms which are pivotally connected at their ends to the centres of said sector shaped plates, toothed quadrants of a pitch radius which is twice that of the toothed sectors for meshing with the respective toothed sectors, independent spring means for rotating each of said shafts thereby permitting rotation of said radial arms to displace said rigid plates during which time the adjacent edges of the rigid plates traverse a rectilinear path across the aperture in said casing, means for latching said shafts against rotation by said spring means, means for releasing first one and then the other of said latching means whereby one plate commences to move before the other so that there is a gap between the adjacent edges of said plates through which light may pass during movement thereof to effect an exposure, and means for varying the time interval between the releasing of said latching means.

6. A focal plane shutter for a camera comprising in combination a housing formed with an exposure aperture in a wall thereof, a pair of carrier means pivoted in said housing, a pair of rigid plates each of large enough dimensions to cover said exposure aperture and each pivoted substantially centrally to one of said carrier means, gearing means for guiding said plates so that, during the pivotal movements of said carrier means, the one edge of one of said plates follows the adjacent edge of the other of said plates along a path substantially parallel to said exposure aperture and actuating means for moving said plates so that light may pass to said exposure aperture through the gap between said adjacent edges of said plates.

DOUGLAS GORDON HUNTER.